Oct. 27, 1931.                  H. R. STANDLEE                  1,829,069
                                CONTROL VALVE
                            Filed Sept. 15, 1928          2 Sheets-Sheet 2
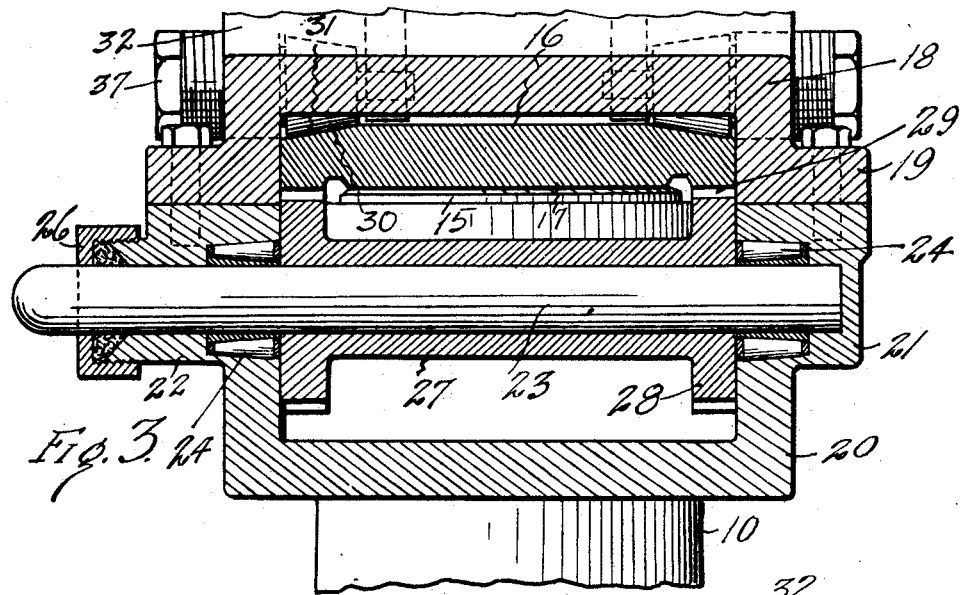
Fig. 3.
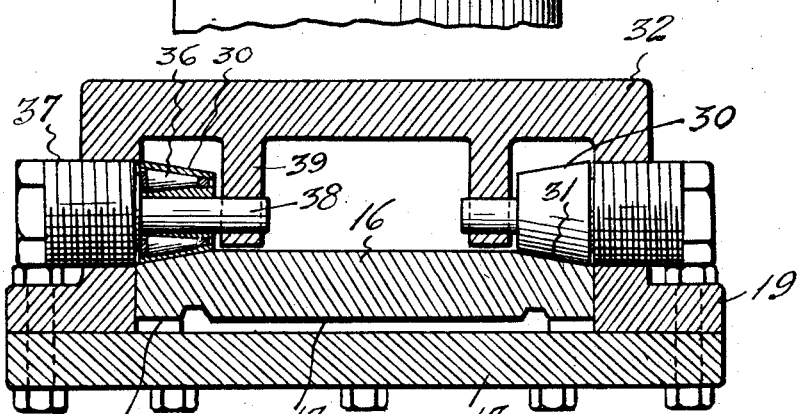
Fig. 4.
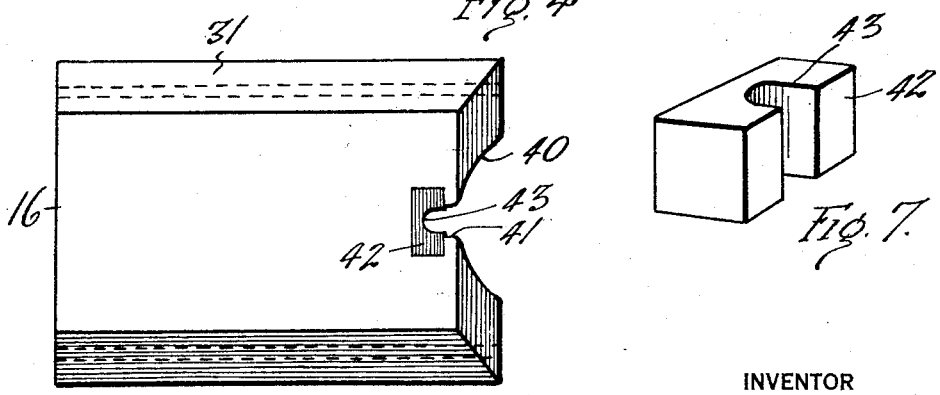
Fig. 6.                                                    Fig. 7.
INVENTOR
H. R. STANDLEE,
BY Jack Ashley
ATTORNEY Patented Oct. 27, 1931

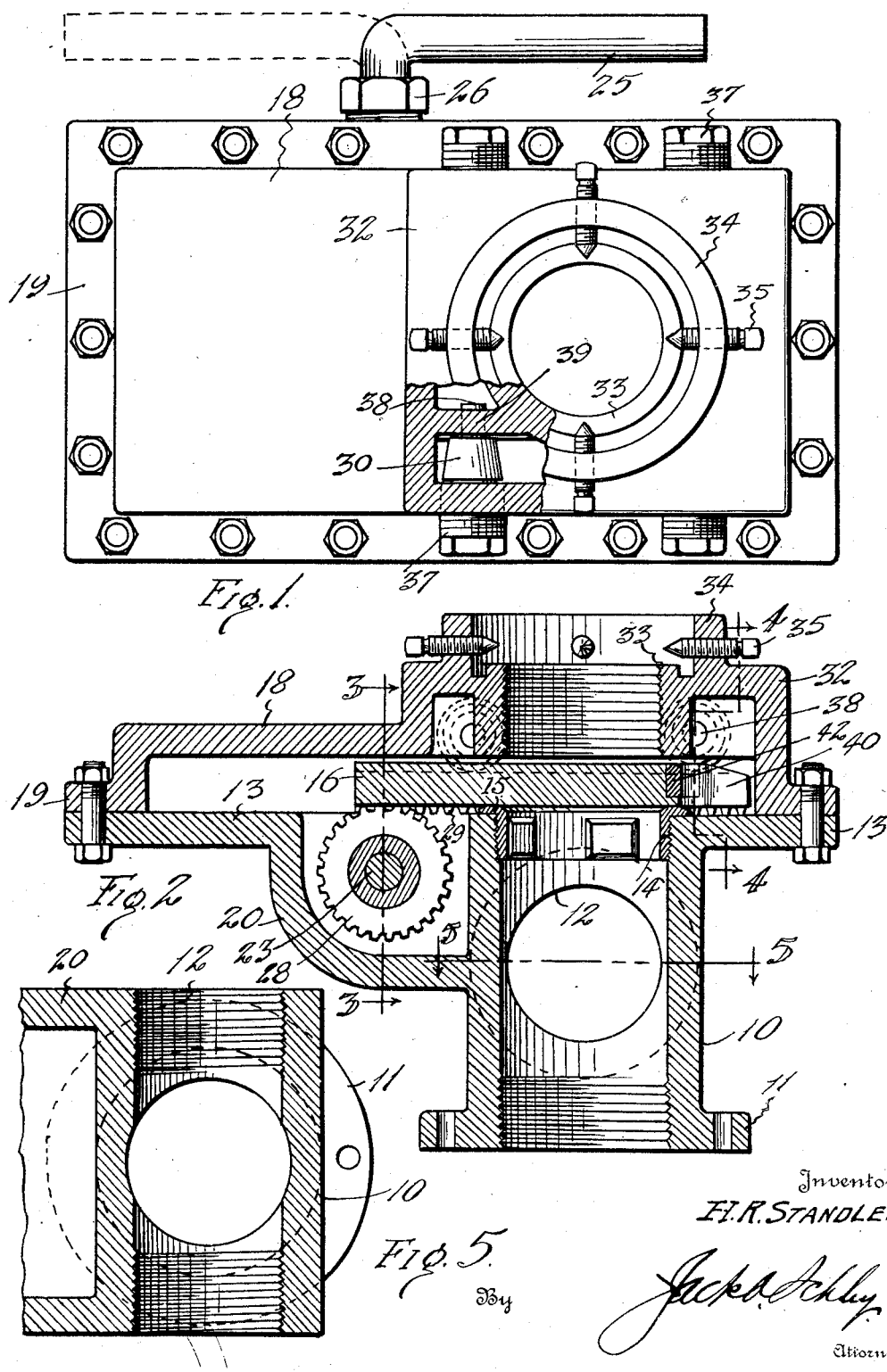

1,829,069

UNITED STATES PATENT OFFICE

HARVEY RICHARD STANDLEE, OF TULSA, OKLAHOMA

CONTROL VALVE

Application filed September 15, 1928. Serial No. 306,156.

This invention relates to new and useful improvements in control valves.

One object of the invention is to provide a control valve for well casing heads and similar uses, whereby the flow of fluids, such as oil and gas, may be quickly, safely and easily shut off.

Another object of the invention is to provide a control valve having a positively operating gate held to its seat by roller bearings, whereby a fluid-tight closure is produced without increasing the labor incident to operation or offering additional resistance to the closing and opening thereof.

A further object is to produce a control valve which will be substantial, convenient and simple, thus making for economical manufacture, operation and maintenance.

A construction designed to carry out the invention will be hereinafter described, together with other features of the invention.

The invention will be more readily understood from a reading of the following specification and by reference to the accompanying drawings, in which an example of the invention is shown, and wherein:

Fig. 1 is a plan view with a portion in section and showing a control valve constructed in accordance with the invention, Fig. 2 is a vertical sectional view of the same, Fig. 3 is an enlarged transverse sectional view taken on the line 3—3 of Fig. 2, Fig. 4 is a similar view taken on the line 4—4 of Fig. 2, Fig. 5 is a horizontal cross-sectional view taken on the line 5—5 of Fig. 2, Fig. 6 is a plan view of the gate, and Fig. 7 is an isometrical view of the cable cushion block.

In the drawings the numeral 10 designates a casing head having a base flange 11 for securing it in place and also has opposite outlets 12. The head is internally threaded at its lower end for receiving the casing (not shown).

At its top the head has a laterally extending supporting plate 13. A valve seat ring 14 is screwed into the upper end of the bore of the head and has an annular seat flange 15 overlying the plate. The ring may be removed and replaced when desired.

A horizontal flat valve gate 16 has a central longitudinal boss 17 sliding on the seat 15. A cover 18 has a marginal flange 19 by which it is bolted to the plate. A transverse case 20 connects the plate with one side of the head (Figs. 2 and 3) and bearing bosses 21 and 22 are formed at each end of the case. The plate 13, cover 18 and case 20 constitute a housing.

A crank shaft 23 extending through the case is journaled in roller bearings 24 in the bosses 21 and 22. The shaft has a handle 25 outside the housing. The boss 21 is closed at its outer side and the shaft extends through a packing 26 on the boss 22. A gear spool 27 is fastened on the shaft within the case and has integral pinions 28 at each end engaging in racks 29 on the underside of the gate 16 along each side thereof. It will be seen that by swinging the handle the gate will be reciprocated in the housing.

For holding the gate on the seat 15 conical rollers 30 are mounted in the cover 18 so as to bear on the beveled tracks 31 along each side of the gate. The cover 18 has a dome 32 provided with an interior collar 33 axially alined with the bore of the head 10. A flange 34 on top of the dome surrounds the collar and has set screws 35 for securing an oil saver or other appliance. The rollers 30 are mounted on roller bearings 36 in the dome.

Plugs 37 are screwed into the sides of the dome and carrying stub shafts 38 on which the bearings 36 are mounted. Webs 39 in the dome (Figs. 1 and 4) support the inner ends of the shafts 38. The plugs and rollers are removable. By adjusting the plugs the rollers are moved transversely of the tracks 31, thus forcing the gate to its seat or relieving the pressure of the gate on the seat, as may be necessary.

By revolving the spool 27 the gate 16 is moved in the housing to cover and uncover the valve seat 15. The size of the pinions 28 is such that a swing of the handle 25 from the dotted position to the full position in Fig. 1 will completely close the gate. This may be quickly, conveniently and safely done, and is one of the features of the invention.

The roller bearings 24 and 36 make for easy and quick operation. The bearings 36 permit of a close contact between the boss 17 and the seat 15, without so much frictional contact as to interfere with the rapid working of the gate. When a well suddenly starts flowing a high gas or oil pressure, no time can be lost in closing off the head. By the time the ordinary gate valve is screwed closed, great damage may be done and often such a valve cannot be closed on account of the pressure.

The gate herein described may be instantly closed and held against leaking. Where a cable is suspended through the head a recess 40 is provided in the front center of the gate 16 and a cable notch 41 is provided in the recess. A rubber or cushion block 42 embedded in the gate has a seat 43 (Figs. 2, 6 and 7) registering with the notch for receiving the cable (not shown) and holding it against the inner walls of the collar 33 and the ring 14. The front end of the gate 16 may be beveled off so as to clear the lower edge of the collar 33.

The recess 40 has a very useful function in connection with the opening of the gate. It is desirable to keep the boss 17 at all times resting upon the seat 15 and when the gate is fully opened the recess 40 will conform to the seat and thus not obstruct the flow through the head.

Various changes in the size and shape of the different parts, as well as modifications and alterations, may be made within the scope of the appended claims.

What I claim, is:

1. In a control valve, a casing head, a housing in the head, an annular valve seat in the housing, a valve gate slidable across said seat and having parallel bearing faces at opposite sides and parallel racks alined with said faces, anti-friction rollers in the housing holding the valve to its seat by contact with said faces, a gearing in the housing engaging said racks for sliding the gate, and means for operating the gearing.

2. In a control valve, a casing head, a housing in the head, and annular valve seat in the housing, a valve gate having an arcuate recess at one end with its sides in slidable contact with said seat, anti-friction rollers in the housing engaging one face of the gate for holding the valve to its seat, a gearing in the housing engaging the opposite face of the gate for sliding the gate, means for operating the gearing, and means for adjusting the rollers toward and from the gate to vary the frictional contact of the gate with its seat.

3. In a control valve, a casing head, a housing mounted on the head, a valve gate slidable in the housing, a shaft in the housing, a pinion on the shaft engaging the gate, means for rocking the shaft, the gate having beveled tracks along each side inclined in opposite directions, and tapering rollers in the housing adjustable to vary the contact pressure on said tracks.

4. In a control valve, a casing head, a supporting plate on the head, a case on the head, a shaft passing through the case, a sleeve on the shaft having a pinion at each end, a valve gate slidable over the plate, a valve seat within the plate and under the gate, racks on the gate engaging the pinions, a cover on the plate over the gate, a dome on the cover, a handle for rocking the shaft, oppositely inclined tracks on each side of the gate at its face opposite the racks, and axially adjustable conical rollers in the dome engaging the tracks.

5. In a control valve, a casing head having a valve seat, a valve gate mounted on said casing to slide in contact with said seat, axially adjustable rollers engaging tracks upon one face of the gate for constantly holding it to its seat, and means engaging the opposite face of the gate for sliding the same.

6. In a control valve, a casing head having a valve seat, a valve gate mounted on the casing to slide in contact with said seat, rollers engaging one face of the gate for holding it to its seat, axially adjustable plugs mounted in the casing to shift said rollers laterally of the gate travel, a gear engaging the opposite face of said gate for sliding the same, and means for actuating said gear.

In testimony whereof I affix my signature.

HARVEY RICHARD STANDLEE.